(12) United States Patent
Shingyoji et al.

(10) Patent No.: US 7,205,929 B2
(45) Date of Patent: Apr. 17, 2007

(54) RADAR SYSTEM AND VEHICLE CONTROLLER INCORPORATING RADAR SYSTEM

(75) Inventors: Masahito Shingyoji, Sakado (JP); Hiroyuki Ando, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 11/166,590

(22) Filed: Jun. 25, 2005

(65) Prior Publication Data

US 2007/0013576 A1    Jan. 18, 2007

(51) Int. Cl.
*G01S 13/93* (2006.01)

(52) U.S. Cl. .............. 342/70; 342/27; 342/73; 342/71; 342/72; 342/89; 342/91; 342/93

(58) Field of Classification Search ............... 342/27, 342/70–73, 82–103, 159, 173, 174, 198
See application file for complete search history.

(56) References Cited

U.S. PATENT DOCUMENTS

| | | | | |
|---|---|---|---|---|
| 5,657,024 A | * | 8/1997 | Shingyoji et al. | 342/175 |
| 5,717,399 A | * | 2/1998 | Urabe et al. | 342/70 |
| 5,745,050 A | * | 4/1998 | Nakagawa | 340/903 |
| 6,147,637 A | * | 11/2000 | Morikawa et al. | 342/70 |
| 6,906,661 B2 | * | 6/2005 | Sawamoto et al. | 342/70 |
| 7,142,289 B2 | * | 11/2006 | Ando et al. | 356/4.01 |
| 2004/0257556 A1 | * | 12/2004 | Samukawa et al. | 356/4.01 |
| 2006/0152705 A1 | * | 7/2006 | Yoshida et al. | 356/5.01 |
| 2006/0220945 A1 | * | 10/2006 | Ohtake et al. | 342/70 |
| 2006/0227037 A1 | * | 10/2006 | Ando et al. | 342/70 |
| 2007/0013576 A1 | * | 1/2007 | Shingyoji et al. | 342/70 |

FOREIGN PATENT DOCUMENTS

JP    2000-019242    1/2000

* cited by examiner

*Primary Examiner*—John B. Sotomayor
(74) *Attorney, Agent, or Firm*—O'Melveny & Myers LLP

(57) ABSTRACT

An electromagnetic wave is transmitted from a signal transmission antenna using a signal transmission IC; this electromagnetic wave is received, after having been reflected by a target object, by signal receiving antennas and signal receiving ICs; and the distance to the target object or the azimuth of the target object is detected by a signal processing section. The signal receiving antennas have approximately the same signal receiving characteristics and directivity in approximately the same direction, and are arranged in a row with a predetermined gap between them, thus constituting an antenna array. The levels of the signals received by these signal receiving antennas are detected by a received signal level detection means, and an external objects adhesion detection means decides that some external objects are adhered to the front surface of the signal receiving antennas, if the dispersion, or the level difference, between the levels of these signals received from the antennas is greater than a predetermined value.

18 Claims, 7 Drawing Sheets

RADAR SYSTEM AND VEHICLE CONTROLLER INCORPORATING RADAR SYSTEM

BACKGROUND OF THE INVENTION

1. Field of the Invention

The present invention relates to a radar system which detects neighboring objects, and to a vehicle controller installed in a vehicle, which includes such a radar system, and which performs driving control of the vehicle.

Priority is claimed on Japanese Patent Application No. 2004-203302, the content of which is incorporated herein by reference.

2. Description of Related Art

In the past, in a radar system for a vehicle which detects objects in the vicinity of the vehicle and which includes within its detection range the surface of the road upon which the vehicle is running, there have been included a signal transmission section which emits an electromagnetic wave which is frequency modulated, a signal receiving section which receives electromagnetic wave that is reflected from objects and obtains beat signals by mixing this received wave with a part of the electromagnetic wave, and a signal processing section which detects objects in the vicinity of the vehicle by analyzing the frequency of the beat signal. In the signal processing section of such a device, the first threshold which takes the frequency of the beat signal as a parameter of the signal receiving level, and the second threshold which is higher than the first threshold value, are set. The signal processing section, along with using the beat frequency which exceeds the second threshold for detection of objects in the vicinity, makes the decision that dirt is present upon the signal transmission section or the signal receiving section, if the number of occurrences of a beat frequency of a received signal level which exceeds the first threshold in a predetermined frequency range, is less than a predetermined value within a predetermined time period.

Hence, since the received signal level of the signal which is reflected by the road surface and which returns to the signal receiving section, is lower than the average received signal level of the signal which is reflected by objects that are actually required to be detected such as a vehicle ahead of the subject vehicle or an obstruction or the like, by setting the second threshold to be higher than the received signal level of the signal which is reflected from the road surface and which is the noise, is eliminated during object detection and accordingly it becomes possible to perform accurate detection. Furthermore, by setting the first threshold to be lower than the average received signal level of the signal which is reflected from the road surface, it becomes possible for a signal of receiving level which exceeds the first threshold to be always received while the vehicle is running. In other words, if a beat frequency of a level which exceeds the first threshold merely appears within a predetermined period of time, it may be decided that the received signal level has become lower due to dirt (for example, refer to Japanese Patent Publication No. 3428009).

However if an attempt is made to utilize, as a receiving antenna for such a prior art type radar system, an antenna array which includes a plurality of receiving antennas and all of which have approximately the same signal receiving characteristics and directivity in the same direction, and which are arranged in a line with a predetermined gap between them, then the problem arises with such prior art devices that, in the event that dirt or the like has adhered to only a portion of the plurality of receiving antennas, it has not been possible to perform an accurate decision as to whether or not such dirt has adhered. In concrete terms since, for the receiving antennas to which no dirt has adhered, received signals whose level exceeds the first threshold continue to be received, accordingly, for the synthetic output signal of the antenna array, it is not possible to decide whether or not the received signal level has been deteriorated due to the presence of dirt, and even in the state in which, for example, dirt has actually adhered to one or more of the receiving antennas, it may be erroneously determined that the state is that in which no dirt has thus adhered, which is very undesirable. Accordingly, there is the problem in that it is not possible to determine in the device itself that, due to the adhesion of dirt upon a portion of the plurality of receiving antennas, the proper performance as an antenna array cannot be obtained.

The present invention has been conceived in the light of the above described problem, and it takes as its objective to provide a radar system which can decide simply and moreover accurately as to the presence of an external object adhered upon its antenna, and moreover to provide a vehicle controller which includes such a radar system, and which executes appropriate vehicle control based upon the presence of an external object adhered upon the antenna.

SUMMARY OF THE INVENTION

In order to solve the above described problem, the first aspect of the present invention is the radar system which obtains: a transmitter which transmits an electromagnetic wave; a receiver which receives the electromagnetic wave after it has been reflected by an object; and a processor which determines the distance to or the azimuth of the object by processing a signal which is involved in the reflected wave that has been received by the receiver, wherein the receiver has a plurality of signal receiving antennas which have approximately the same signal receiving characteristics and directivity in approximately the same direction, and which are arranged in a row with a predetermined gap between them; and the processor includes: a received signal level detector which detects the levels of the signals which have been received by the plurality of signal receiving antennas; and an objects adhesion detector which decides that some external objects are adhered to the front surface of the receiver, if the dispersion between the levels of the signals which have been received from the plurality of signal receiving antennas, as detected by the received signal level detector, is greater than a predetermined value.

The radar system which has the above described structure is one in which the transmitter transmit wave, the electromagnetic wave is received by the receiver after it has been reflected by an object, and the distance to the object or the azimuth of the object is detected by a processor by processing a signal which has been received by the receiver; and, with the receiver obtaining a plurality of signal receiving antennas which have approximately the same signal receiving characteristics and directivity in approximately the same direction, and which are arranged in a row with a predetermined gap between them, the levels of the signals which have been received by the plurality of signal receiving antennas are detected by the received signal level detector, and, by the objects adhesion detector deciding that some external objects are adhered to the front surface of the receiver, if the variation between the levels of the signals which have been received from the plurality of signal receiving antennas, as detected by the received signal level detector, is greater than a predetermined value, it becomes possible to determine whether or not any external object are present as adhered upon the front surface of the receiver, based upon the variation of the received signal level between the plurality of signal receiving antennas.

The second aspect of the present invention is the radar system which obtains: a transmitter which transmits an electromagnetic wave; a receiver which receives the electromagnetic wave after it has been reflected by an object; and a processor which determines the distance to the object or the azimuth of the object by processing a signal which is involved in the reflected wave that has been received by the receiver, wherein the receiver includes a plurality of signal receiving antennas which have approximately the same signal receiving characteristics and directivity in approximately the same direction, and which are arranged in a row with a predetermined gap between them; and the processor obtains: a received signal level detector which detects the levels of the signals which have been received by the plurality of signal receiving antennas; and an objects adhesion detector which decides that some external objects are adhered to the front surface of the receiver, if the difference between the levels of the signals which have been received from the plurality of signal receiving antennas, as detected by the received signal level detector, is greater than a predetermined value.

The radar system which has the above described structure is one in which the transmitter transmit wave, the electromagnetic wave is received by the receiver after it has been reflected by an object, and the distance to the object or the azimuth of the object is detected by a processor by processing a signal which is involved in the reflected wave that has been received by the receiver; and, with the receiver obtaining a plurality of signal receiving antennas which have approximately the same signal receiving characteristics and directivity in approximately the same direction, and which are arranged in a row with a predetermined gap between them, the levels of the signals which have been received by the plurality of signal receiving antennas are detected by the received signal level detector, and, by the objects adhesion detector deciding that some external objects are adhered to the front surface of the receiver, if the level difference of the levels of the signals which have been received from the plurality of signal receiving antennas, as detected by the received signal level detector, is greater than a predetermined value, it becomes possible to determine whether or not any external object are present as adhered upon the front surface of the receiver, based upon the level difference of the levels of the signals between the plurality of signal receiving antennas.

The third aspect, or the fourth aspect, of the present invention is the radar system according to the first aspect, or the second aspect, of the present invention, wherein if it has been decided by the objects adhesion detector that some external objects are adhered to the front surface of the receiver, the processor, along with calculating the average value of the levels of the signals which have been received by the plurality of signal receiving antennas, compensates those received signals from the signal receiving antennas for which the level difference between the average value of the received signal level which has been calculated and the signal level which has been received is greater than a predetermined value, and determines the distance to the object or the azimuth of the object, based upon the received signals which have been compensated, and the received signals from the signal receiving antennas for which compensation has not been performed.

With the radar system which has the above described structure, if it has been decided by the objects adhesion detector that some external objects are adhered to the front surface of the receiver, the processor first calculates the average value of the levels of the signals which have been received by the plurality of signal receiving antennas, and then compensates those received signals from the signal receiving antennas for which the level difference between the average value of the received signal level which has been calculated and the signal level which has been received is greater than a predetermined value. By detecting the distance to the object or the azimuth of the object based upon the received signals which have been compensated and the received signals from the signal receiving antennas for which compensation has not been performed, the processor is able to discriminate, referring to the average value of the received signal levels from the plurality of signal receiving antennas, between the signal receiving antennas that are under the influence due to the adhesion of the external objects and the signal receiving antennas that are available in their current state, and also able to detect the distance to the object or the azimuth of the object while eliminating, as much as possible, the influence of adhered external objects upon the signal receiving antennas.

The fifth aspect, or the sixth aspect, of the present invention is the radar system according to the first aspect, or the second aspect, of the present invention, wherein if it has been decided by the objects adhesion detector that some external objects are adhered to the front surface of the receiver, the processor, along with calculating the maximum value of the levels of the signals which have been received by the plurality of signal receiving antennas, compensates those received signals from the signal receiving antennas for which the level difference between the maximum value of the received signal level which has been calculated and the signal level which has been received is greater than a predetermined value, and determines the distance to the object or the azimuth of the object, based upon the received signals which have been compensated, and the received signals from the signal receiving antennas for which compensation has not been performed.

With the radar system which has the above described structure, if it has been decided by the objects adhesion detector that some external objects are adhered to the front surface of the receiver, the processor first calculates the maximum value of the levels of the signals which have been received by the plurality of signal receiving antennas, and then compensates those received signals from the signal receiving antennas for which the level difference between the maximum value of the received signal level which has been calculated and the signal level which has been received is greater than a predetermined value. By detecting the distance to the object or the azimuth of the object, based upon the received signals which have been compensated, and the received signals from the signal receiving antennas for which compensation has not been performed, the processor is able to discriminate referring to the maximum values of the received signal levels from the plurality of signal receiving antennas, between the signal receiving antennas that are under the influence due to the adhesion of external objects and the signal receiving antennas that are available in their current state, and also to detect the distance to the object or the azimuth of the object while eliminating, as much as possible, the influence of adhered external objects upon the signal receiving antennas.

The seventh aspect, or the eighth aspect, of the present invention is the radar system according to the first aspect, or the second aspect, of the present invention, wherein if the objects adhesion detector decides that some external objects are adhered to the front surface of the receiver, the processor, along with calculating the average value of the levels of the signals which have been received by the plurality of signal receiving antennas, ignores those received signals from the signal receiving antennas for which the level difference between the average value of the received signal level which has been calculated and the signal level which has been received is greater than a predetermined value, and determines the distance to the object or the azimuth of the object, based upon the signals received from the signal receiving antennas that are not ignored.

With the radar system which has the above described structure, if it has been decided by the objects adhesion detector that some external objects are adhered to the front surface of the receiver, the processor first calculates the average value of the levels of the signals which have been received by the plurality of signal receiving antennas, and then ignores those received signals from the signal receiving antennas for which the level difference between the average value of the received signal level which has been calculated and the signal level which has been received is greater than a predetermined value. Then, by detecting the distance to the object or the azimuth of the object based upon the signals received from the signal receiving antennas that are not ignored, the processor is able to discriminate, referring to the average values of the received signal levels from the plurality of signal receiving antennas, between those signal receiving antennas that are under the influence due to the adhesion of external objects from those signal receiving antennas that are available in their current state, and also to detect the distance to the object or the azimuth of the object while eliminating, as much as possible, the influence which is exerted upon the signal receiving antennas by adhered external bodies.

The ninth aspect, or the tenth aspect, of the present invention is the radar system according to the first, or the second aspect, of the present invention, wherein if the objects adhesion detector decides that some external objects are adhered to the front surface of the receiver, the processor, along with calculating the maximum value of the levels of the signals which have been received by the plurality of signal receiving antennas, ignores those received signals from the signal receiving antennas for which the level difference between the maximum value of the received signal level which has been calculated and the signal level which has been received is greater than a predetermined value, and determines the distance to the object or the azimuth of the object, based upon the signals received from the signal receiving antennas that are not ignored.

With the radar system which has the above described structure, if it has been decided by the objects adhesion detector that some external objects are adhered to the front surface of the receiver, the processor first calculates the maximum value of the levels of the signals which have been received by the plurality of signal receiving antennas, and then ignores the received signals from the signal receiving antennas for which the level difference between the maximum value of the received signal level which has been calculated and the signal level which has been received is greater than a predetermined value. Then, by detecting the distance to the object or the azimuth of the object based upon the signals received from the signal receiving antennas that are not ignored, the processor is able to discriminate, referring to the maximum values of the received signal levels from the plurality of signal receiving antennas, between the signal receiving antennas that are under the influence due to the adhesion of external objects and the signal receiving antennas that are available in their current state, and also to detect the distance to the object or the azimuth of the object while eliminating, as much as possible, the influence which is exerted upon the signal receiving antennas by adhered external objects.

The eleventh aspect, or the twelfth aspect, of the present invention is the vehicle controller which obtains a radar system according to the first aspect, or the second aspect, of the present invention, and which controls a vehicle based upon the output signal from the radar system, and further includes an alerter which, if the objects adhesion detector decides that an external object is adhered upon the front surface of the receiver, notifies a person riding in the vehicle that the receiver is in the state in which an external object is adhered thereupon.

With the vehicle controller which has the above described structure, which includes the radar system as described in the first aspect or the second aspect of the present invention, and which controls a vehicle based upon the output signal from the radar system, if it has been decided by the objects adhesion detector that an external object is adhered upon the front surface of the receiver, the alerter notifies a person riding in the vehicle of the fact that the receiver of the radar system is in the state in which an external object is adhered thereupon, and thereby it is possible to make the person riding in the vehicle aware that an external object is adhered to the front surface of the receiver.

The thirteenth aspect, or the fourteenth aspect, of the present invention is the vehicle controller which obtains a radar system according to the first aspect, or the second aspect, of the present invention, and which controls a vehicle based upon the output signal from the radar system, and further includes a vehicle controller which, if the objects adhesion detector decides that an external object is adhered upon the front surface of the receiver, stops control of the vehicle, or determines that the error in detection of the distance to or the azimuth of the object is large, or shifts the control of the vehicle to radar fail control in which the occurrence of errors is anticipated.

With the vehicle controller which has the above described structure, which includes the radar system as described above, and which controls a vehicle based upon the output signal from the radar system, if it has been decided by the objects adhesion detector that an external object is adhered upon the front surface of the receiver, the vehicle controller, by stopping the control of the vehicle, is able to stop controlling the vehicle and to entrust the control of the vehicle to the person who is riding in the vehicle, when it is not possible for the receiver of the radar system to receive the reflected wave from an object appropriately. Or, when it is not possible for the receiver of the radar system to receive the reflected wave from a target body appropriately due to that the vehicle controller determines that the error in detection of the distance to the object or the azimuth of the object is large and shifts the control of the vehicle to radar fail control in which the occurrence of errors is anticipated, it is possible to control the vehicle while having some leeway based upon the radar fail control, as compared to the case in which the receiver of the radar system is not under any influence due to an external object.

The fifteenth aspect, or the sixteenth aspect, of the present invention is the vehicle controller which obtains a radar system according to the third aspect, or the fourth aspect, of the present invention, and which controls a vehicle based upon the output signal from the radar system, and further obtains a vehicle controller which, when the distance to or the azimuth of the object are detected based upon the received signals which have been compensated by the processor, performs vehicle control by taking the detection error in the distance or the azimuth to be greater than the distance to or the azimuth of the object that are detected based upon received signals from the signal receiving antennas for which compensation has not been performed.

With the vehicle controller which has the above described structure, which includes the radar system as described in the third aspect of the present invention, and which controls a vehicle that is based upon the output signal from the radar system, it is possible to control the vehicle with a certain amount of leeway that is based upon the distance to the object or the azimuth of the object which has been detected, even when it is not possible for the receiver of the radar system to receive the reflected wave from the object appropriately, due to that while the vehicle controller is performing vehicle control, when the processor determines the distance to the object or the azimuth of the object based upon the received signals which have been compensated by the processor, the vehicle controller takes the detection error in the distance or the azimuth to be greater than the distance or the azimuth that is detected based upon received signals from the signal receiving antennas for which compensation has not been performed.

The seventeenth aspect, or the eighteenth aspect, of the present invention is the vehicle controller which obtains a radar system according to the seventh aspect, or the eighth aspect, of the present invention, and controls a vehicle based upon the output signal from the radar system, with the processor ignoring the signals received from a portion of the signal receiving antennas, and further obtains a vehicle controller which, when the distance to or the azimuth of the object is detected based upon the received signals from the remainder of the signal receiving antennas, performs vehicle control by taking the detection error in the distance or the azimuth to be greater than the distance to or the azimuth of the object that is based upon received signals from all of the signal receiving antennas.

With the vehicle controller which has the above described structure, which includes the radar system as described in the fifth aspect of the present invention, and which controls a vehicle based upon the output signal from the radar system, it is possible to control the vehicle while having a certain amount of leeway based upon the distance to the object or the azimuth of the object which has been detected even when it is not possible for the receiver of the radar system to receive the reflected wave from the object appropriately, due to that when the processor ignores the signals received from a portion of the signal receiving antennas and determines the distance to the object or the azimuth of the object based upon the received signals from the signal receiving antennas that are not ignored, while the vehicle controller is performing vehicle control, the vehicle controller takes the detection error in the distance or the azimuth to be greater than the distance or the azimuth that are detected based upon the received signals from all of the signal receiving antennas.

According to the radar system as described in the first aspect of the present invention, it is possible to determine whether or not any external object is present adhered upon the front surface of the receiver, based upon the variation of the received signal level between the plurality of signal receiving antennas.

Accordingly, the beneficial effect is obtained that, even if some external objects are adhered upon the front surface of one or more of the plurality of signal receiving antennas, it is possible to decide simply and easily and moreover accurately that such external objects are adhered to the front surface of the receiver, since this decision is performed based upon the variation in the received signal levels between the plurality of signal receiving antennas that are included in the receiver.

According to the radar system as described in the second aspect of the present invention, it is possible to determine whether or not any external object are present adhered upon the front surface of the receiver, based upon the level difference of the received signal levels between the plurality of signal receiving antennas.

Accordingly, the beneficial effect is obtained that, even if some external objects are adhered upon the front surface of one or more of the plurality of signal receiving antennas, it is possible to decide simply and easily and moreover accurately that such an external objects are adhered to the front surface of the receiver, since this decision is performed based upon the level difference of the received signal levels between the plurality of signal receiving antennas which are included in the receiver.

According to the radar system as described in the third or the fourth aspect of the present invention, it is possible to detect the distance to an object or the azimuth of an object while eliminating, as much as possible, the influence of adhered external objects upon the signal receiving antennas, by discriminating between those signal receiving antennas which are under the influence due to the adhesion of external objects and those signal receiving antennas which are available in their current state, referring to the average values of the received signal levels from the plurality of signal receiving antennas Accordingly the beneficial effect is obtained that, even if some external body is adhered to the front surface of the receiver, it is possible to detect the distance to an object or the azimuth of an object by taking the maximum effective advantage of the performance of the receiver which is constituted from the plurality of signal receiving antennas, referring to the signals which have been received by all of the signal receiving antennas.

According to the radar system as described in the fifth or the sixth aspect of the present invention, it is possible to discriminate between those signal receiving antennas which are under the influence due to the adhesion of an external object and those signal receiving antennas that are available in their current state referring to the maximum values of the received signal levels from the plurality of signal receiving antennas, and to detect the distance to an object or the azimuth of an object while eliminating, as much as possible, the influence of adhered external objects upon the signal receiving antennas.

Accordingly, the beneficial effect is obtained that, even when some external objects are adhered to the front surface of the receiver, it is possible to detect the distance to an object or the azimuth of an object by using the signals which have been received by all of the signal receiving antennas and taking the maximum effective advantage of the performance of the receiver which is constituted from the plurality of signal receiving antennas.

According to the radar system as described in the seventh or the eighth aspect of the present invention, it is possible to discriminate between those signal receiving antennas which are under the influence due to the adhesion of an external object and those signal receiving antennas which are available in their current state referring to the average values of the received signal levels from the plurality of signal receiving antennas, and to detect the distance to an object or the azimuth of an object while eliminating, as much as possible, the influence of adhered external objects upon the signal receiving antennas.

Accordingly, the beneficial effect is obtained that, even when some external objects are adhered to the front surface of the receiver, it is possible to detect the distance to an object or the azimuth of an object by using the signals which have been received by those of the signal receiving antennas that are available, and taking the maximum effective advantage of the performance of the receiver which is constituted from the plurality of signal receiving antennas.

According to the radar system as described in the ninth or the tenth aspect of the present invention, referring to the maximum values of the received signal levels from the plurality of signal receiving antennas, it is possible to discriminate between those signal receiving antennas which are under the influence due to the adhesion of an external object and those signal receiving antennas which are available in their current state, and to detect the distance to an object or the azimuth of an object while eliminating, as much as possible, the influence of adhered external bodies upon the signal receiving antennas.

Accordingly, the beneficial effect is obtained that, even when some external objects are adhered to the front surface of the receiver, it is possible to detect the distance to an object or the azimuth of an object by using the signals which have been received by those of the signal receiving antennas that are available, and taking the maximum effective advantage of the performance of the receiver which is constituted by the plurality of signal receiving antennas.

According to the vehicle controller as described in the eleventh or the twelfth aspect of the present invention, when it is decided by the objects adhesion detector that an external object is adhered upon the front surface of the receiver, a person riding in the vehicle is notified by the alerter of the fact that an external object is adhered upon the receiver of the radar system.

Accordingly, the beneficial effect is obtained that it is possible to impel the person riding in the vehicle to eliminate the external object which is adhered upon the front surface of the receiver of the radar system, and that it is possible to urge him or her to promote safer running of the vehicle according to his or her own decision without leaving all of the control functions of the vehicle.

According to the vehicle controller as described in the thirteenth or the fourteenth aspect of the present invention, if the receiver of the radar system is not able appropriately to receive the reflected wave from an object, then control of the vehicle is stopped and the control of the vehicle is entrusted to the person who is riding in the vehicle, or, it is possible to control the vehicle based upon radar fail control with a certain amount of leeway even when the receiver is not under the influence of any adherent external objects.

Accordingly, the beneficial effect is obtained that it is possible to control the vehicle more safely and moreover in a more appropriate manner, in consideration of the influence of any external object which may be adhered upon the front surface of the receiver of the radar system.

According to the vehicle controller as described in the fifteenth or the sixteenth aspect of the present invention, when the processor determines the distance to an object or the azimuth of an object based upon received signals which have been compensated, then the vehicle controller is able to control the vehicle while allowing a certain amount of leeway based upon the distance or the azimuth which have been detected, by performing the vehicle control while taking the detection error for the distance or the azimuth to be large, even though the receiver of the radar system is not able to receive the wave which is reflected from the object in an appropriate manner.

Accordingly, the beneficial effect is obtained that it is possible to control the vehicle more safely and moreover in a more appropriate manner, in consideration of the influence of any external object which may be adhered upon the front surface of the receiver of the radar system.

According to the vehicle controller as described in the seventeenth or the eighteenth aspect of the present invention, when the processor ignores the received signals from a portion of the signal receiving antennas, and determines the distance to an object or the azimuth of an object based upon the signals which are received from the signal receiving antennas that are not ignored, then the vehicle controller is able to control the vehicle while allowing a certain amount of leeway based upon the distance or the azimuth which have been detected, even though the receiver of the radar system is not able to receive the wave which is reflected from the object in an appropriate manner, by performing the vehicle control while taking the detection error for the distance or the azimuth to be large.

Accordingly, the beneficial effect is obtained that it is possible to control the vehicle more safely and moreover in a more appropriate manner, in consideration of the influence of any external object which may be adhered upon the front surface of the receiver of the radar system.

DETAILED DESCRIPTION OF THE INVENTION

In the following, the embodiments of the present invention are described with reference to the figures.

The Embodiments

Device Structure

Figure 1:
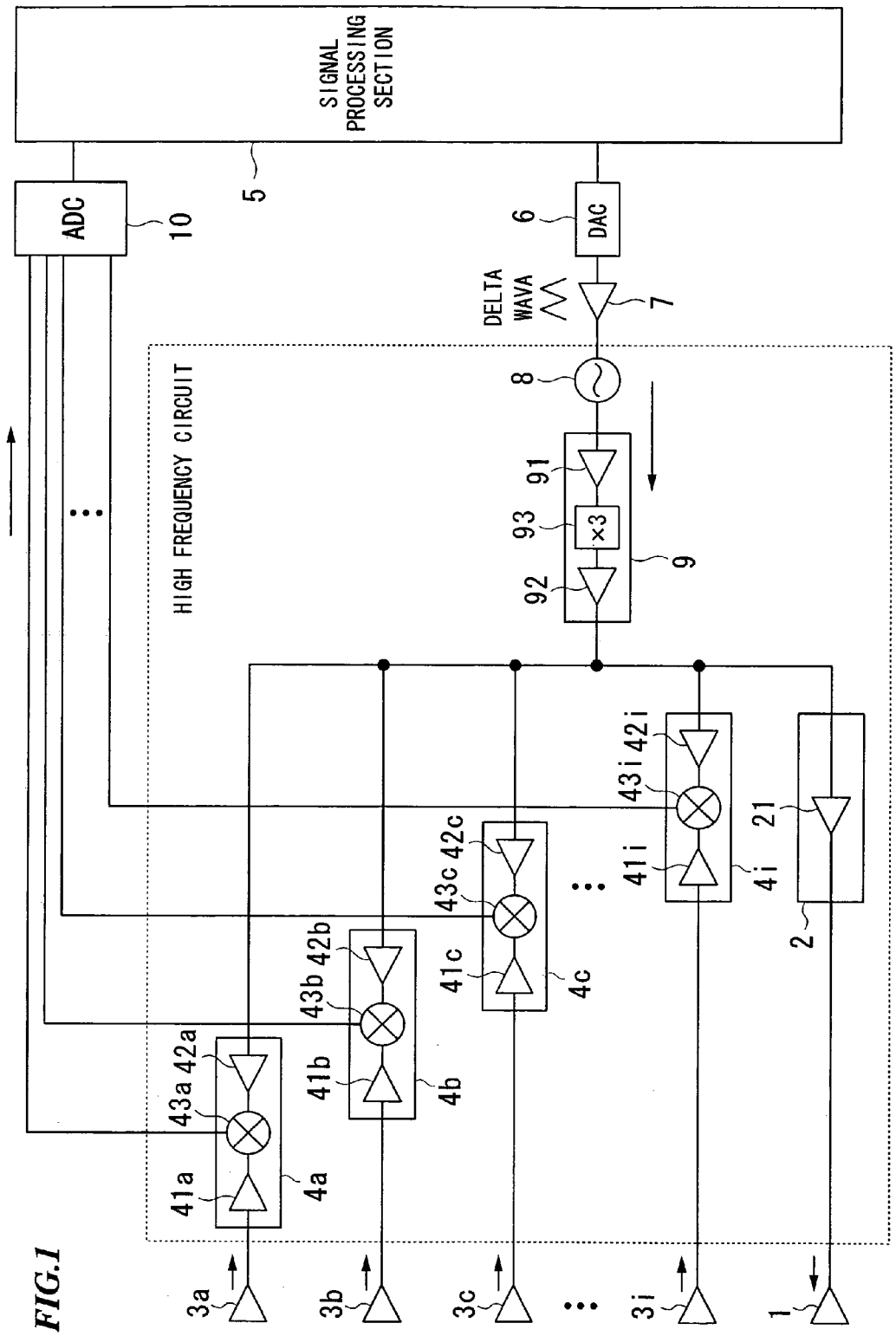
FIG. 1 is a block diagram showing the structure of a radar system according to an embodiment of the present invention.

FIG. 1 is a block diagram showing the structure of a radar system according to the embodiment of the present invention.

Referring to this figure, this radar system according to the embodiment involves a signal transmission antenna 1 and a signal transmission IC 2 which transmit an electromagnetic wave that is used for detecting the distance to an object and its azimuth, nine signal receiving antennas 3a through 3i which have approximately the same signal receiving characteristics and directivity in approximately the same direction as one another, which are arranged with predetermined gaps between them, and which receive the reflected wave which is produced by the object due to the reflection of the above electromagnetic wave, nine signal receiving ICs 4a through 4i which have approximately the same characteristics as one another, and a signal processing section 5 which processes the signals received by the signal receiving antennas 3a through 3i and the signal receiving ICs 4a through 4i, and which detects the distance to the body or its azimuth.

To explain this matter in more concrete terms, the radar system of this embodiment obtains a DAC 6 which converts a digital control signal output by the signal processing section 5 into an analog control signal (a delta wave), and this analog control signal output by the DAC 6, after being amplified by an amplifier 7, is input to a VCO 8, which is an oscillator.

Furthermore, along with a signal that is based upon the control by the control signal from the signal processing section 5 being generated by the VCO 8, the output signal from the VCO 8 is input to a frequency multiplier IC 9 which involves amplifiers 91 and 92 and a frequency multiplier 93, and its frequency is converted into, for example, a frequency three times higher. The output signal of this frequency multiplier IC 9 is supplied to the signal transmission IC 2, is amplified by the amplifier 21, and is transmitted from the signal transmission antenna 1 as an electromagnetic wave.

Furthermore, the output signal of the frequency multiplier IC 9 is also supplied to each of the signal receiving ICs 4a through 4i, and, in each of these signal receiving ICs 4a through 4i, along with the signal which has been input from the respective signal receiving antenna 3a through 3i being amplified by a corresponding amplifier 41a through 41i, the above signal from the frequency multiplier IC 9 is also amplified by a corresponding amplifier 42a through 42i. In each of the signal receiving ICs 4a through 4i, the amplitude alteration and the phase alteration of the signal appearing in the reflection of the electromagnetic wave reflected from any objects is detected, by mixing (multiplying) the output signal from its amplifier 41a through 41i and the output signal from its amplifier 42a through 42i with a corresponding mixer 43a through 43i, and supplied to an ADC 10. In this ADC 10, the signals which have been supplied from the mixers 43a through 43i are converted into digital signals by time division, and output to the signal processing section 5. Furthermore, in this description of the embodiment of the present invention, the various signals which correspond to the signal receiving antennas 3a through 3i, and which are input from the ADC 10 to the signal processing section 5, are expressed as channels CH0 through CH8.

The number of the signal receiving antennas and the signal receiving ICs shown in this embodiment of the present invention is only an example, and it would be acceptable for the signal receiving antennas and the signal receiving ICs, which are taken as being a single group, to be provided in any suitable number, if the beneficial effects of the phased array antenna, as explained below, based on the processing capability of the signal processing section 5 and the object detection capability of this radar system, are obtained to a sufficient extent.

The Phased Array Antenna

Next, referring to the drawings, the theory of this phased array antenna which consists of the signal receiving antennas 3a through 3i are explained briefly. With the signal transmission antenna 1 and the signal receiving antennas 3a through 3i of this embodiment of the present invention, as shown in FIG. 2 which illustrates an example of an antenna structure of a radar system and the theory of a phased array antenna, along with the first signal receiving antenna 3a being arranged so as to be separated from the signal transmission antenna 1 by a pitch dr0, the signal receiving antennas 3b through 3i are arranged in a line following on from the first signal receiving antenna 3a, with equal gaps of a pitch d being left between them.

Figure 2:
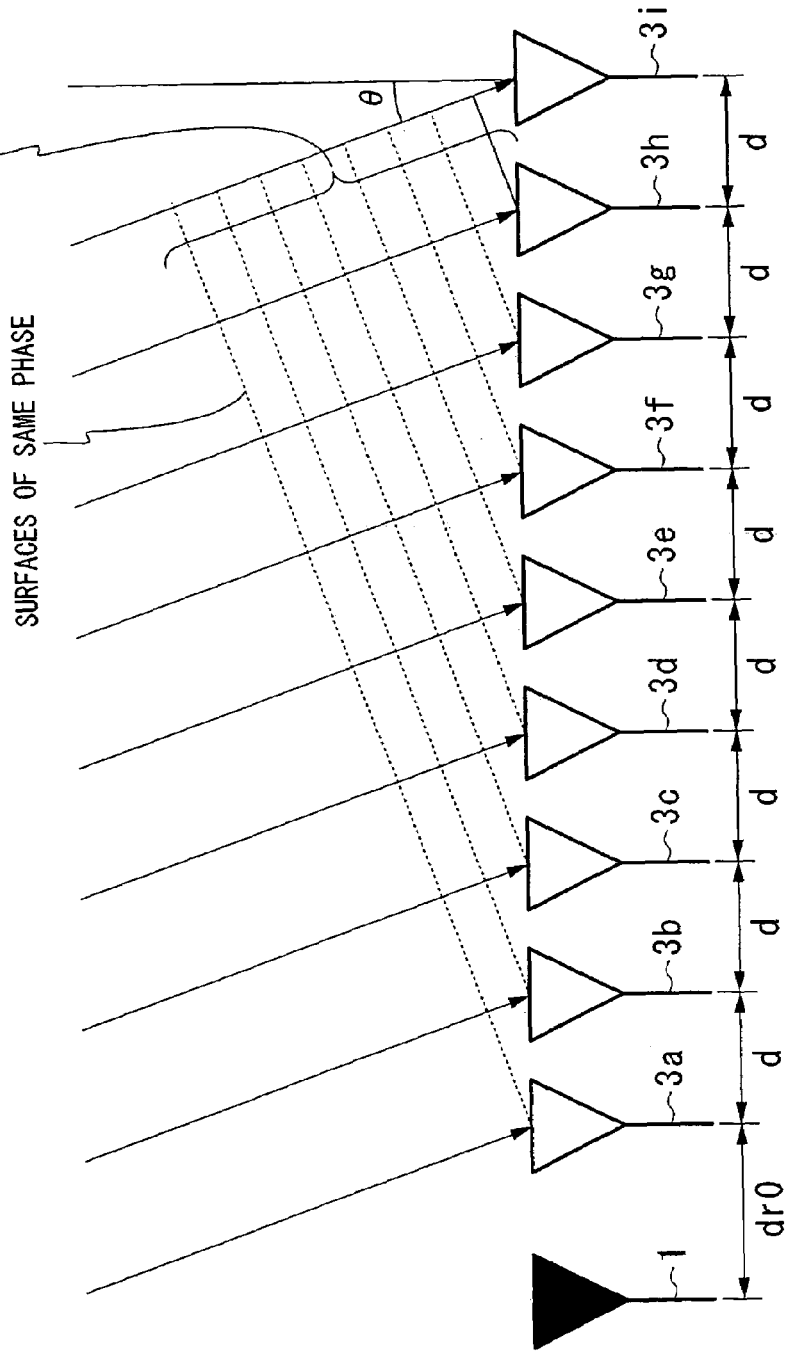
FIG. 2 is a figure showing an example of the antenna structure of this radar system according to an embodiment, and showing the theory of a phased array antenna.

Since, as shown in FIG. 2, with the signal receiving antennas 3a through 3i being arranged in this manner, the phase difference between adjacent ones of these signal receiving antennas 3a through 3i is calculated according to the Equation (1) below, based upon the pitch d between the antennas and the direction θ to the target, accordingly, for example, delay circuits are provided to the output signals of the signal receiving antennas 3a through 3i, so as to make the phase difference between adjacent ones of the antennas to be the same in correspondence to the direction θ to the target, therefore, it is possible to accentuate only the signals which arrive from the direction θ of the target by synthesizing signals which correspond to the signal receiving antennas as the output signals of the delay circuits.

Figure 3:
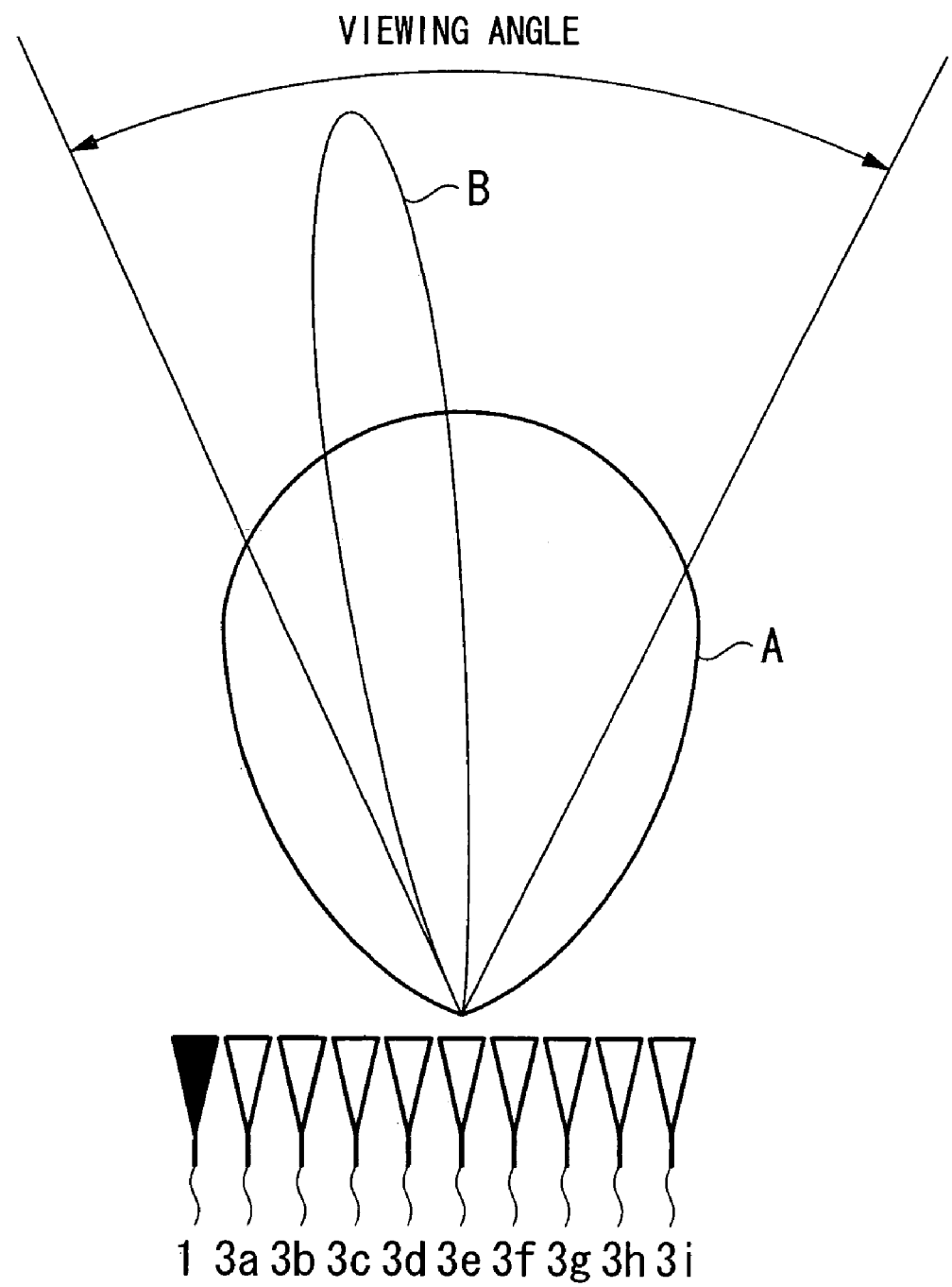
FIG. 3 is a figure showing an antenna pattern which has been phase synthesized by this phased array antenna.

In other words, by controlling the delay times of the delay circuits which are inserted in the output signals of each of the signal receiving antennas 3a through 3i, it is possible freely to control the directivity after synthesis of the signal receiving antennas 3a through 3i, as shown in FIG. 3, which shows an antenna pattern which has been phase synthesized. In FIG. 3, the reference symbol A denotes the directivity pattern of each single antenna element of the signal receiving antennas 3a through 3i, while the reference symbol B denotes the directivity pattern of the phased array antenna which has been obtained by selecting the above delay circuits arbitrarily and synthesizing the output signals of the signal receiving antennas 3a through 3i.

$$\text{Phase difference between adjacent antennas} = 2\pi \times d \times \sin \theta / \text{signal wavelength} \qquad (1)$$

Figure 4:
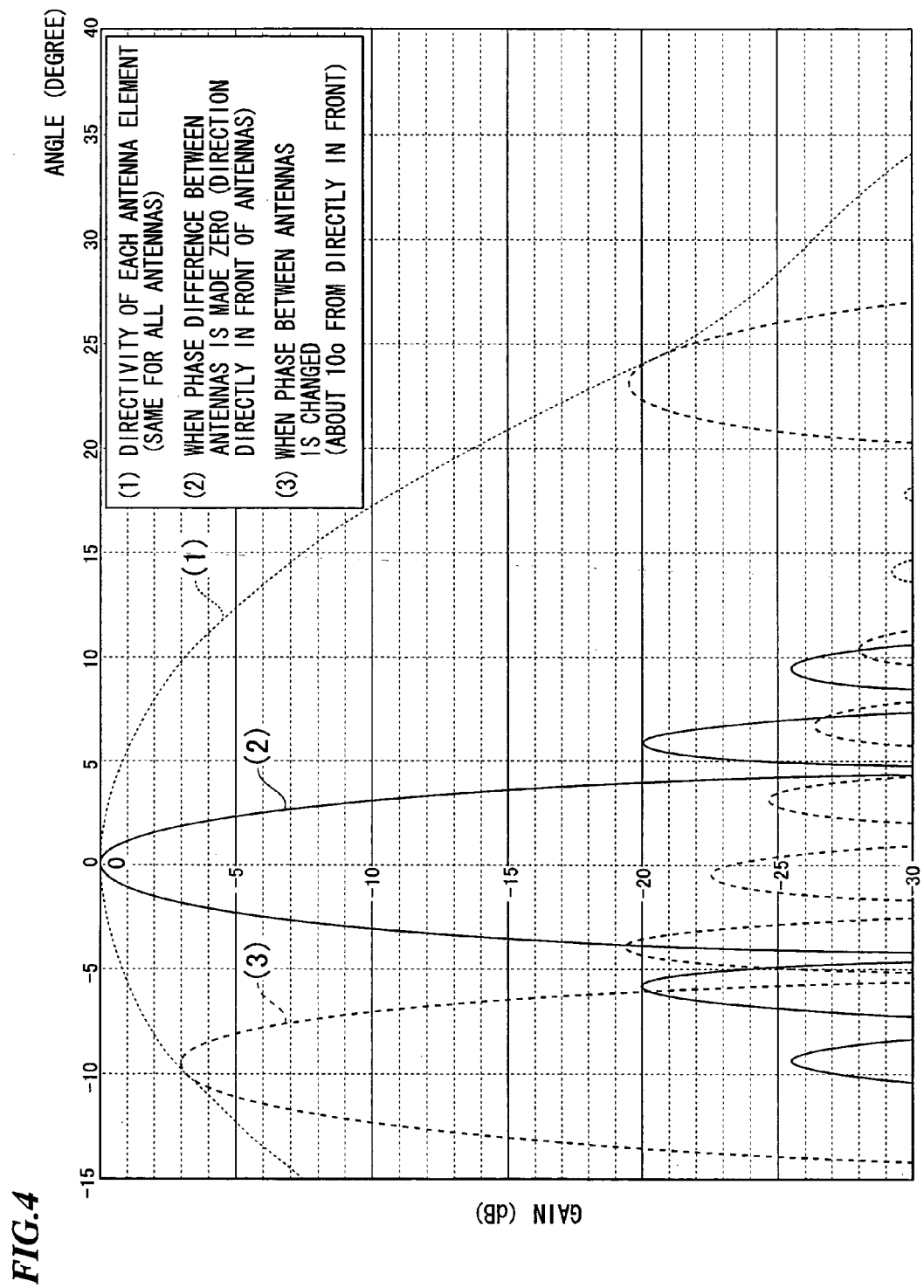
FIG. 4 is an example of the directivity of this phased array antenna.

Specifically, FIG. 4 shows an example of the directivity of this phased array antenna. In FIG. 4, the characteristic shown by (a) gives the individual directivity of one of the signal receiving antenna elements of the signal receiving antennas 3a through 3i, and when this is synthesized for a target direction θ=0°, the characteristic becomes as shown by (b). Furthermore, if the signal receiving antenna elements whose individual characteristics are as shown by (a) are synthesized in the same manner for a target direction θ=10°, then the characteristic becomes as shown by (c).

The Antenna Shape

Figure 5A:
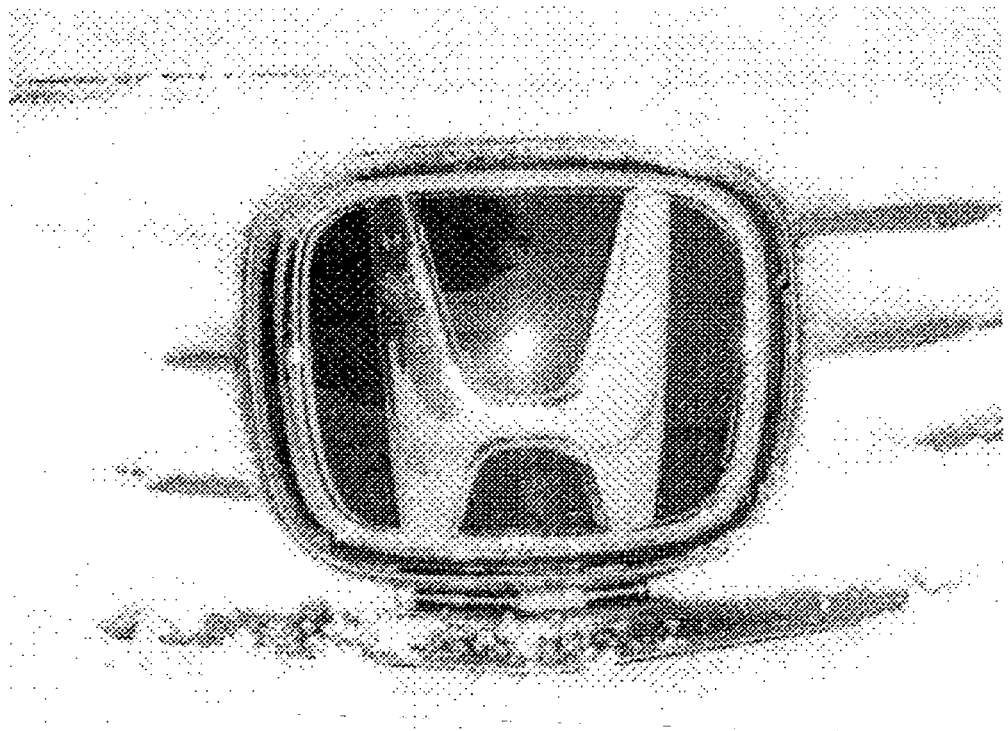
FIG. 5A is a figure showing examples of the arrangement of the antenna of the radar system of the same embodiment of the present invention.

Moreover, the signal transmission antenna 1 and the signal receiving antennas 3a through 3i are arranged upon the rear side of an emblem which is fitted to the front surface of a vehicle, as in FIG. 5A which shows an example of this antenna arrangement.

The External Object Detection Procedure and the Vehicle Control Procedure

Next, the operation of an external object detection procedure using the signal receiving antennas 3a through 3i of this radar system according to this embodiment of the present invention, and the operation of a vehicle control procedure performed by a vehicle control device (not shown in the figures) which performs running control of a vehicle to which the radar system is attached, are described in detail with reference to the figures.

Figure 6:
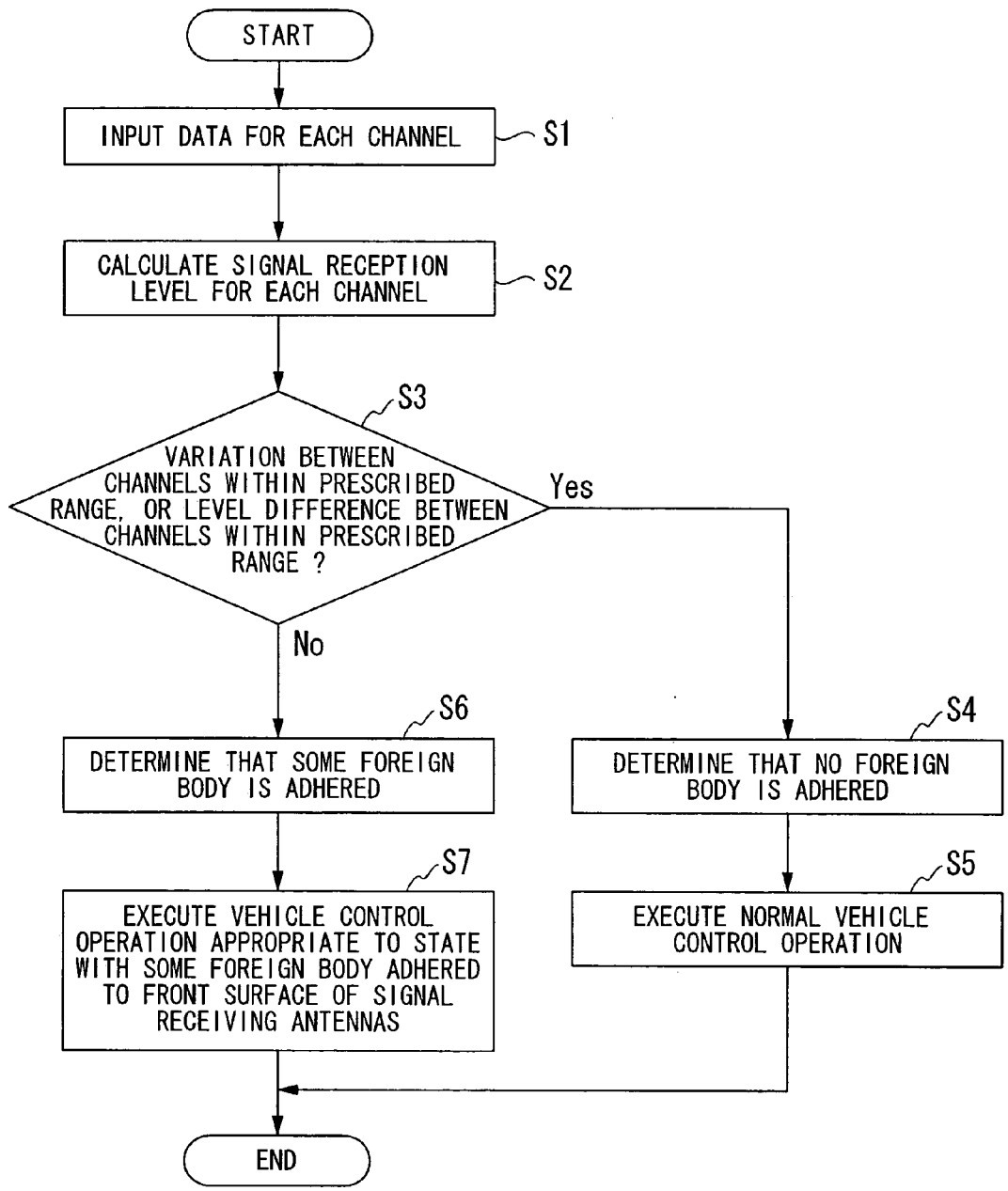
FIG. 6 is a flow chart showing the external object detection procedure operation of this radar system according to the embodiment of the present invention, and of the vehicle control procedure operation of a vehicle control device which performs running control of its vehicle and which incorporates the radar system.

FIG. 6 is a flow chart showing the operation of this external object detection procedure by the radar system of this embodiment, and the operation of this vehicle control procedure by the vehicle control device which performs running control of a vehicle to which the radar system is attached.

Referring to FIG. 6, in step S1, the data of the various channels (CH0 through CH8) which correspond to the signal receiving antennas 3a through 3i is input by the radar system, thus specifying the amplitude alteration and the phase alteration of the signals which appear in the reflection of the electromagnetic wave which has been reflected by a target object; and, in step S2, the signal receiving level of each of the channels (CH0 through CH8) which correspond to the signal receiving antennas 3a through 3i is detected based on the data for the channels (CH0 through CH8) which correspond to the signal receiving antennas 3a through 3i. Hereafter, the signal receiving level or levels of signals means the intensity of signals which is included in the electromagnetic wave.

A decision is made (in step S3) as to whether or not the variation between the channels is within a prescribed range, or whether or not the difference between the channels is within a prescribed range, in order to perform a determination as to whether or not any external object are adhered upon the front surface of the signal receiving antennas 3a through 3i (in other words, upon the front surface of the emblem of FIG. 5A).

Figure 5B:
FIG. 5B is a figure showing examples of the arrangement of the antenna of the radar system of the same embodiment of the present invention.

To explain in terms of an example, by contrast to the situation shown in FIG. 5A in which no such external object is adhered upon the emblem, FIG. 5B shows an example in which some external object such as, for example, snow or the like has become adhered upon the front surface of the signal receiving antennas 3a through 3i, i.e. upon the front surface of the emblem. Since at this time each of the signal receiving antennas 3a through 3i experience the influence of this snow independently and differently, when their states in which no snow is thus adhered and their states in which snow is thus adhered are compared together, some phenomena can be detected in the data of each of the channels (CH0 through CH8) which correspond to these signal receiving antennas 3a through 3i, such as that the data upon the channels is independently attenuated for each of the channels, the data upon the channels is independently phase changed for each of the channels, and the like.

Figure 7A:
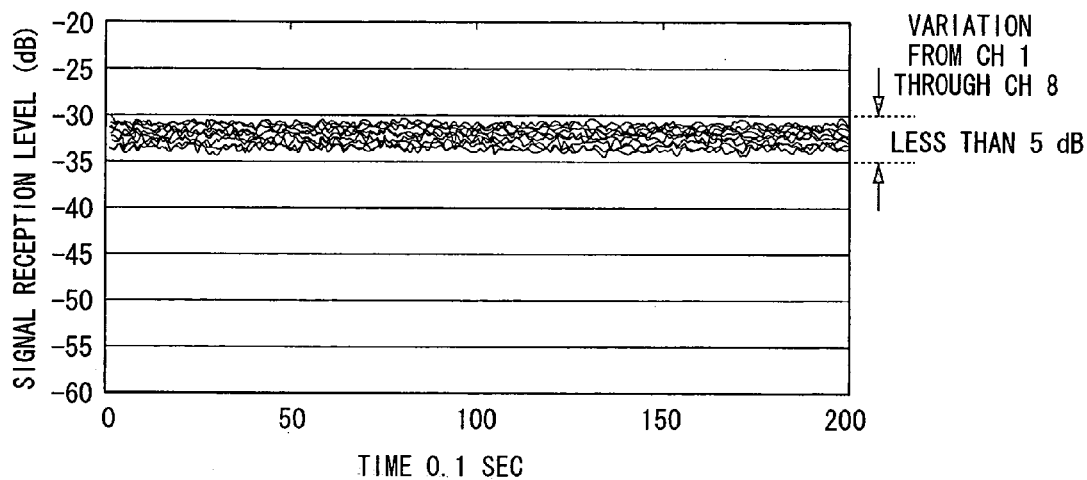
FIG. 7A is a figure showing configurations of data upon various channels (CH0 through CH8) of the radar system according to the same embodiment of the present invention.
Figure 7B:
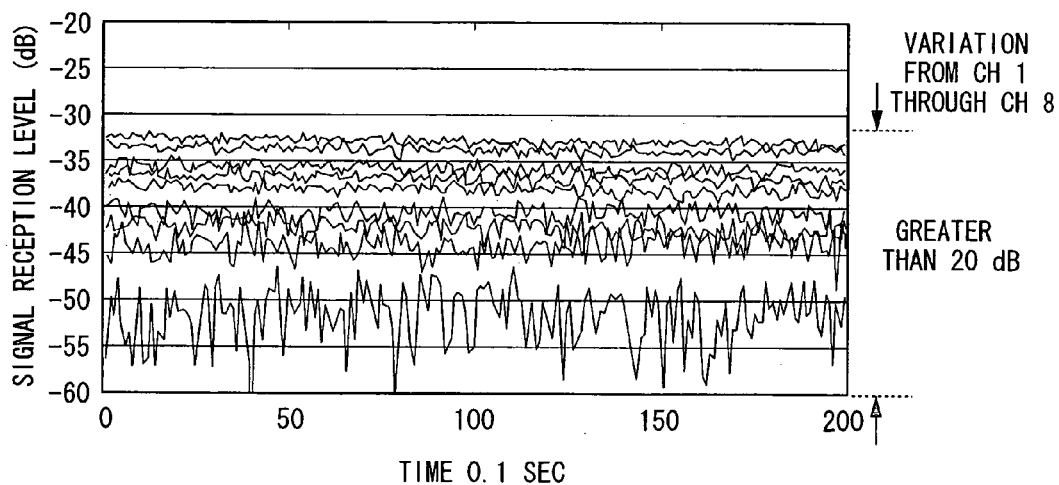
FIG. 7B is a figure showing configurations of data upon various channels (CH0 through CH8) of the radar system according to the same embodiment of the present invention.

In concrete terms, as shown in FIG. 7A and FIG. 7B which show the state of the data on each of the channels (CH0 through CH8), by contrast to the state in which, as in FIG. 5B, no snow is adhered upon the emblem, and in which, as shown in FIG. 7A, the "variation" in the signal receiving levels of the various channels (CH0 through CH8) which correspond to the signal receiving antennas 3a through 3i is, for example, less than 5 "dB", however, in the state in which, as in FIG. 5B, snow is adhered upon the emblem, the "variation" in the signal receiving levels of the various channels (CH0 through CH8) which correspond to the signal receiving antennas 3a through 3i becomes, for example, greater than 20 "dB", as shown in FIG. 7B.

Thus, in step S3, by making one of the decision #1 and the decision #2 shown below, using the signal receiving levels of the various channels (CH0 through CH8) which correspond to the signal receiving antennas 3a through 3i, a determination is performed as to whether or not any external object are adhered upon the front surface of the signal receiving antennas 3a through 3i (i.e. upon the front surface of the emblem of FIG. 5A).

To explain decision #1 in concrete terms, in this decision #1, in order to make the determination as to whether or not any external object are adhered to the front surface of the signal receiving antennas 3a through 3i based on the "variation between channels" of the signal receiving levels of the various channels (CH0 through CH8) which correspond to these signal receiving antennas 3a through 3i, along with calculating the average value of these signal receiving levels of the various channels (CH0 through CH8) which correspond to these signal receiving antennas 3a through 3i, this average value of these signal receiving levels of the various channels (CH0 through CH8) which has thus been calculated is compared with the signal receiving level of each of the channels (CH0 through CH8), and, if there exists one of the signal receiving antennas for which the difference of its signal level from the average value of the signal receiving levels of the various channels (CH0 through CH8) which has thus been calculated is greater than a predetermined value (i.e., if the variation between the various channels is not within the prescribed range), then it is determined that some external objects are adhered to the front surface of the signal receiving antennas 3a through 3i.

Furthermore, to explain decision #2, in this decision #2, in order to make the determination as to whether or not any external object are adhered to the front surface of the signal receiving antennas 3a through 3i based on the "difference of levels between channels" of the signal receiving levels of the various channels (CH0 through CH8) which correspond to these signal receiving antennas 3a through 3i, along with calculating the maximum value of these signal receiving levels of the various channels (CH0 through CH8) which correspond to these signal receiving antennas 3a through 3i, this maximum value of these signal receiving levels of the various channels (CH0 through CH8) which has thus been calculated is compared with the signal receiving level of each of the channels (CH0 through CH8), and, if there exists one of the signal receiving antennas for which the difference of its signal level from the maximum value of the signal receiving levels of the various channels (CH0 through CH8) which has thus been calculated is greater than a predetermined value (i.e., if the level difference between the various channels is not within the prescribed range), then it is determined that some external objects are adhered to the front surface of the signal receiving antennas 3a through 3i.

If, in this step S3, when the decision #1 has been made and the variation between channels is within the prescribed range, or when the decision #2 has been made and the level difference between channels is within the prescribed range (YES in step S3), then this radar system decides (in step S4) that the current state is the one in which no external object is adhered to the front surface of the signal receiving antennas 3a through 3i, and the vehicle control device (not shown in the figures), which includes this radar system and which is performing running control of the vehicle, executes normal vehicle control operation (in step S5).

On the other hand if, in this step S3, when the decision #1 has been made and the variation between channels is not within the prescribed range, or when the decision #2 has been made and the level difference between channels is not within the prescribed range (NO in step S3), then this radar system decides that the current state is the one in which some external objects are adhered to the front surface of the signal receiving antennas 3a through 3i (in step S6), and the vehicle control device (not shown in the figures), which includes this radar system and which is performing running control of the vehicle, executes vehicle control operation which is appropriate to this dirty state in which some external objects are adhered to the front surface of the signal receiving antennas $3a$ through $3i$ (in step S7).

In the following, the procedures of the vehicle control operation is explained in concrete terms, that is performed in step S7 in correspondence to the state in which some external objects are adhered upon the front surface of the signal receiving antennas $3a$ through $3i$.

(1) Fail display: the vehicle control device (not shown in the figures) executes failure display by notifying a person in the vehicle (i.e., the driver), via a display light, a display screen, voice output, or the like, that in the current state some external objects are adhered upon the front surface of the signal receiving antennas $3a$ through $3i$.

(2) Vehicle control: the running control of the vehicle by the vehicle control device (not shown in the figures) is performed according to one or the other among the following two possibilities:

(a): The running control of the vehicle is stopped;

(b): The running control of the vehicle shifts to radar fail control, in correspondence to the current state in which some external objects are adhered upon the front surface of the signal receiving antennas $3a$ through $3i$.

(2-b): Radar fail control: radar fail control for running control of the vehicle is performed according to one of the following five possibilities:

(a): Along with the distance to an object or the azimuth of an object being detected in the normal manner by the radar system by using all of the data of the channels (CH0 through CH8), the vehicle control device (not shown in the figures) decides that many errors (i.e., the detection error is large) are included in the distance to an object or the azimuth of an object which has been detected, and if, during control, this decision is made with regard to the distance to the object or the azimuth of the object, then the vehicle control device shifts to a form of control in which it anticipates that errors that are generated, such as one in which it prevents the occurrence of decision errors or the like by adding a certain margin to the threshold value for decision.

(b): If it is possible to particularize the external object, or if it is possible to particularize the external object from the alteration to the data of each channel, then the data for the channels which correspond to the signal receiving antennas that are under the influence of the external object is compensated by the radar system by using the characteristics of the external object, and the vehicle control device (not shown in the figures) executes normal vehicle control operation, along with detecting the distance to the object or the azimuth of the object by using the data of all of the channels (CH0 through CH8), including those channels for which the data has been compensated.

(c): If it is possible to particularize the external object, or if it is possible to particularize the external object from the alteration to the data of each channels, then the data for the channels which correspond to the signal receiving antennas that are under the influence of the external object is compensated by the radar system by using the characteristics of the external object, and the vehicle control device (not shown in the figures), along with detecting the distance to the object or the azimuth of the object by using the data of all of the channels (CH0 through CH8), including those channels for which the data has been compensated, decides whether or not the error which is included in the distance to the object or the azimuth of the object which have been detected is great (the detection error is large); and, if it makes this decision during the control with relation to the distance to the object or the azimuth of the object, shifts to a form of control in which it anticipates that errors will be generated, such as one in which it prevents the occurrence of decision errors by adding a certain margin to the threshold value for decision, or the like.

(d): The data for the channels which correspond to the signal receiving antenna or antennas for which is under the influence due to an external object is ignored by the radar system, and, along with detecting the distance to an objector the azimuth of an object by using data that is not ignored, the vehicle control device (not shown in the figures) executes normal vehicle control operation.

(e): The data for the channels which correspond to the signal receiving antennas that are under the influence due to an external object is ignored by the radar system, and, along with detecting the distance to an object or the azimuth of an object by using data that is not ignored, the vehicle control device (not shown in the figures) decides whether or not the error which is included in the distance to the object or the azimuth of the object which have been detected is great (the detection error is large); and, if it makes this decision with relation to the distance to the object or the azimuth of the object during the control, shifts to a form of control in which it anticipates errors that will be generated, such as one in which it prevents the occurrence of decision errors by adding a certain margin to the threshold value for decision, or the like.

With the radar fail control of (2-b), if the above described decision #1 has been executed, the signal receiving antennas for which the level difference from the average value of the signal receiving level of each of the channels (CH0 through CH8) which has been calculated is greater than the predetermined value are taken as being "the signal receiving antennas which are under the influence of an external object". Furthermore, if the above described decision #2 has been executed, the signal receiving antennas for which the level difference from the maximum value of the signal receiving level of each of the channels (CH0 through CH8) which has been calculated is greater than the predetermined value are taken as being "the signal receiving antennas which are under the influence of an external object". Yet further the compensation, using the characteristics of the external object, of the data of the channels which correspond to the signal receiving antennas which are under the influence of an external object, is compensation of attenuation of the signal receiving level or phase variation which the data has been influenced.

Furthermore, with the radar fail control of (2-b), if the distance to a target object or the azimuth of a target object has been detected based upon data which has been compensated by the radar system, the control of the vehicle is performed while taking the detection error for the distance or the azimuth to be larger, than when the distance to or the azimuth of the target object has been detected based upon, at least, only the data for the channels which correspond to the signal receiving antennas for which compensation has not been performed. Yet further, if the radar system has ignored the data for the channels which correspond to a portion of the signal receiving antennas, and has detected the distance to the target object or the azimuth of the target object based upon the data that is not ignored, then the control of the vehicle is performed while taking the detection error for the distance or the azimuth to be larger than in the case when the distance to the target object or the azimuth of the target object has been detected based upon, at least, the data of all of the channels (CH0 through CH8) which correspond to all of the signal receiving antennas.

Yet further, in the above described embodiment of the present invention, the procedure of the step S2 corresponds to the received signal level detector. Even further, the procedures of the steps S3, S4, and S6 correspond to the objects adhesion detector. Moreover, (1) of the step S7 corresponds to the alerter, while (2) of the step S7 corresponds to the vehicle controller.

As it has been explained above, according to the radar system of this embodiment of the present invention, along with an electromagnetic wave being transmitted from the signal transmission antenna 1 using the signal transmission IC 2, the electromagnetic wave is received by the signal receiving antennas 3a through 3i and the signal receiving ICs 4a through 4i after it has been reflected by a target object, and the distance to the target object or the azimuth of the target object are detected by the signal processing section 5; and the signal receiving antennas 3a through 3i, along with having approximately the same signal receiving characteristics and directivity in approximately the same direction, are arranged in a row with a predetermined gap between them, thus constituting an antenna array; and the levels of the signals which have been received by this plurality of signal receiving antennas are detected by the received signal level detection means, and, by the external objects adhesion detection means deciding that some external objects are adhered to the front surfaces of the signal receiving antennas 3a through 3i, if the dispersion between the levels of the signals which have been received from the plurality of signal receiving antennas 3a through 3i, or the level difference between the levels of the received signals from the plurality of signal receiving antennas 3a through 3i, as detected by the received signal level detection means, is greater than a predetermined value, it is possible to determine whether or not any external object are adhered upon the front surfaces of the signal receiving antennas 3a through 3i, based upon the variation of the received signal level between the plurality of signal receiving antennas, or upon the level difference between the levels of the received signals from the plurality of signal receiving antennas.

Accordingly, the beneficial effect is obtained that it is possible to determine simply and easily and moreover accurately whether or not any external object have adhered to the front surfaces of the signal receiving antennas 3a through 3i, even if an external object has adhered to any ones of the plurality of signal receiving antennas, since the decision is made based upon the dispersion of the signal receiving levels between the plurality of signal receiving antennas, or upon the level difference between the received signal levels for the plurality of signal receiving antennas.

Furthermore, if it has been decided by the external objects adhesion detection means that some external objects are adhered to the front surface of the signal receiving antennas 3a through 3i, the signal processing section 5 first calculates the average value, or the maximum value, of the levels of the signals which have been received by the plurality of signal receiving antennas, and then compensates the data of the channels which correspond to the signal receiving antennas for which the level difference between the average value, or the maximum value, of the received signal level which has been calculated and the signal level which has been received is greater than a predetermined value. By detecting the distance to the target object or the azimuth of the target object, using the data for all of the channels (CH0 through CH8), including the data which has been compensated, along with discriminating, from the average values, or the maximum values, of the received signal levels from the plurality of signal receiving antennas, between those signal receiving antennas which are under the influence due to the adhesion of an external object and those signal receiving antennas which are available in their current state, it is also possible to detect the distance to the target object or the azimuth of the target object while eliminating, as much as possible, the influence of adhered external objects upon the signal receiving antennas.

Accordingly, the beneficial effect is obtained that, even if some external objects have adhered to one or more of the signal receiving antennas, it is possible to detect the distance to a target object or the azimuth of a target object while taking the maximum advantage of the antenna array, which consists of the plurality of signal receiving antennas, by using the data which have been received from all of the signal receiving antennas.

Furthermore, by ignoring the data of the channels which correspond to those of the signal receiving antennas for which the level difference from the average value, or the maximum value, of the signal receiving level is greater than the predetermined value, and by detecting the distance to the target object or the azimuth of the target object based upon the data that is not ignored, it becomes possible to discriminate between the signal receiving antennas which are under the influence due to the adhesion of an external object and the signal receiving antennas which are available in the current state based on the average value, or the maximum value, of the signal receiving levels of the plurality of signal receiving antennas, and also it is possible to detect the distance to the target object or the azimuth of the target object while eliminating, as much as possible, the influence of adhered external objects upon the signal receiving antennas.

Accordingly, the beneficial effect is obtained that, even if some external objects have adhered to one or more of the signal receiving antennas, it is possible to detect the distance to a target object or the azimuth of a target object while taking the maximum advantage of the antenna array, which consists of the plurality of signal receiving antennas, by using the data which have been received from those of the signal receiving antennas which are available.

Furthermore, according to the vehicle control device which incorporates this radar system according to the embodiment of the present invention, when the decision is made by the external objects adhesion detection means that some external objects are adhered to the front surfaces of the signal receiving antennas 3a through 3i, the vehicle control means decides to stop the control of the vehicle, or when it is judged that the error in detection of the distance to the target object or the azimuth of the target object is large and the decision that is related to the distance to a target object or the azimuth of a target object is made while controlling, shifting to a radar fail control in which the occurrence of errors is anticipated such as preventing the occurrence of decision errors by allowing a certain leeway in the threshold value which is used for the decision, and the like, is performed, therefore, if it is not possible for the signal receiving antennas of the radar system to receive the reflected wave from the target object in an appropriate manner, it is possible to terminate the control of the vehicle and to entrust the control of the vehicle to a person who is riding in the vehicle, or to control the vehicle based upon radar fail control with a certain leeway, as compared to the case in which the signal receiving antennas are not under any influence from any external object.

Accordingly, the beneficial effect is obtained that it is possible to control the vehicle more safely and moreover in a more appropriate manner, in consideration of the influence of any external object which may be adhered upon the front surface of the signal receiving means of the radar system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A radar system comprising:
    a transmitter which transmits an electromagnetic wave;
    a receiver which receives a reflected wave of the electromagnetic wave that is reflected by an object; and
    a processor which determines distance to the object or azimuth of the object by processing a signal which is involved in the reflected wave that has been received by the receiver; wherein
    the receiver comprises a plurality of signal receiving antennas, which have approximately same signal receiving characteristics and directivity in approximately same direction, and which are arranged in a row with a predetermined gap, and
    the processor comprises:
    a received signal level detector which detects levels of signals that are received by the plurality of signal receiving antennas; and
    an object adhesion detector which decides that an external object is adhered to the front surface of the receiver, if dispersion between the levels of the signals that are received by the plurality of signal receiving antennas and that are detected by the received signal level detector, is greater than a predetermined value.

2. A radar system according to claim 1, wherein the processor,
    if the object adhesion detector decides that an external object is adhered to the front surface of the receiver,
    along with calculating average value of levels of signals which are involved in the reflected wave received by the plurality of signal receiving antennas,
    compensates the received signals from the signal receiving antennas for which level difference between the average value of the received signal level which has been calculated and signal level which has been received is greater than a predetermined value, and
    determines the distance to or the azimuth of the object, based upon the received signals which have been compensated, and the received signals from the signal receiving antennas for which compensation has not been performed.

3. A vehicle control device comprising a radar system according to claim 2, controls a vehicle based upon output signal from the radar system, further comprising:
    a vehicle controller which,
    if the processor determines the distance to or the azimuth of the object based upon the received signals which have been compensated,
    performs vehicle control by taking detection error in the distance or the azimuth to be greater than distance to or azimuth of object based upon received signals from the signal receiving antennas for which compensation has not been performed.

4. A radar system according to claim 1, wherein the processor,
    if the objects adhesion detector decides that an external object is adhered to the front surface of the receiver,
    along with calculating maximum value of levels of the signals which are involved in the reflected wave received by the plurality of signal receiving antennas,
    compensates the received signals from the signal receiving antennas for which level difference between the maximum value of the received signal level which has been calculated and the signal level which has been received is greater than a predetermined value, and
    determines distance to or azimuth of the object, based upon the received signals which have been compensated, and the received signals from the signal receiving antennas for which compensation has not been performed.

5. A radar system according to claim 1, wherein the processor,
    if the objects adhesion detector decides that an external object is adhered to the front surface of the receiver,
    along with calculating average value of the levels of the signals which are involved in the reflected wave received by the plurality of signal receiving antennas, ignores the received signals from the signal receiving antennas for which level difference between the average value of the received signal level which has been calculated and the signal level which has been received is greater than a predetermined value, and
    determines distance to or azimuth of the object, based upon the signals received from the signal receiving antennas that are not ignored.

6. A vehicle control device comprising a radar system according to claim 5, which controls a vehicle based upon output signal from the radar system, wherein
    the processor ignores signals received from a portion of the signal receiving antennas, and further comprises:
    a vehicle controller which,
    if the processor determines the distance to or the azimuth of the object based upon the received signals from the signal receiving antennas that are not ignored,
    performs vehicle control by taking detection error in the distance or the azimuth to be greater than distance to or azimuth of the object based upon received signals from all of the signal receiving antennas.

7. A radar system according to claim 1, wherein the processor,
    if the objects adhesion detector that an external object is adhered to the front surface of the receiver,
    along with calculating maximum value of levels of signals which are involved in the reflected wave received by the plurality of signal receiving antennas,
    ignores the received signals from the signal receiving antennas for which level difference between the maximum value of the received signal level which has been calculated and signal level which has been received is greater than a predetermined value, and determines distance to or azimuth of the object, based upon the signals received from the signal receiving antennas that are not ignored.

8. A vehicle control device comprising a radar system according to claim 1, controls a vehicle based upon output signal from the radar system, further comprising:

an alerter which, if the objects adhesion detector decides that an external object is adhered upon the front surface of the receiver, notifies a person riding in the vehicle that the receiver is in a state in which the external object is adhered.

9. A vehicle control device comprising a radar system according to claim 1, controls a vehicle based upon output signal from the radar system, further comprising:

a vehicle controller which, if the objects adhesion detector decides that an external object is adhered upon front surface of the receiver, stops control of the vehicle or determines that error in detection of distance to or azimuth of the object is large, or shifts the control of the vehicle to radar fail control in which occurrence of errors is anticipated.

10. A radar system comprising:

a transmitter which transmits an electromagnetic wave;

a receiver which receives a reflected wave of the electromagnetic wave that is reflected by an object; and a processor which determines distance to the object or azimuth of the object by processing a signal which is involved in the reflected wave that has been received by the receiver, wherein the receiver comprises a plurality of signal receiving antennas, which have approximately same signal receiving characteristics and directivity in approximately same direction, and which are arranged in a row with a predetermined gap, and the processor comprises:

a received signal level detector which detects levels of signals that are received by the plurality of signal receiving antennas; and an object adhesion detector which decides that an external object is adhered to the front surface of the receiver, if difference between the levels of the signals that are received by the plurality of signal receiving antennas and that are detected by the received signal level detector, is greater than a predetermined value.

11. A radar system according to claim 10, wherein the processor, if the object adhesion detector decides that an external object is adhered to the front surface of the receiver, along with calculating average value of levels of signals which are involved in the reflected wave received by the plurality of signal receiving antennas, compensates the received signals from the signal receiving antennas for which level difference between the average value of the received signal level which has been calculated and signal level which has been received is greater than a predetermined value, and determines the distance to or the azimuth of the object, based upon the received signals which have been compensated, and the received signals from the signal receiving antennas for which compensation has not been performed.

12. A vehicle control device comprising a radar system according to claim 11, controls a vehicle based upon output signal from the radar system, further comprising:

a vehicle controller which, if the processor determines the distance to or the azimuth of the object based upon the received signals which have been compensated, performs vehicle control by taking detection error in the distance or the azimuth to be greater than distance to or azimuth of object based upon received signals from the signal receiving antennas for which compensation has not been performed.

13. A radar system according to claim 10, wherein the processor, if the objects adhesion detector decides that an external object is adhered to the front surface of the receiver, along with calculating maximum value of levels of the signals which are involved in the reflected wave received by the plurality of signal receiving antennas, compensates the received signals from the signal receiving antennas for which level difference between the maximum value of the received signal level which has been calculated and the signal level which has been received is greater than a predetermined value, and determines distance to or azimuth of the object, based upon the received signals which have been compensated, and the received signals from the signal receiving antennas for which compensation has not been performed.

14. A radar system according to claim 10, wherein the processor, if the objects adhesion detector decides that an external object is adhered to the front surface of the receiver, along with calculating average value of the levels of the signals which are involved in the reflected wave received by the plurality of signal receiving antennas, ignores the received signals from the signal receiving antennas for which level difference between the average value of the received signal level which has been calculated and the signal level which has been received is greater than a predetermined value, and determines distance to or azimuth of the object, based upon the signals received from the signal receiving antennas that are not ignored.

15. A vehicle control device comprising a radar system according to claim 14, which controls a vehicle based upon output signal from the radar system, wherein the processor ignores signals received from a portion of the signal receiving antennas, and further comprises:

a vehicle controller which, if the processor determines the distance to or the azimuth of the object based upon the received signals from the signal receiving antennas that are not ignored, performs vehicle control by taking detection error in the distance or the azimuth to be greater than distance to or azimuth of the object based upon received signals from all of the signal receiving antennas.

16. A radar system according to claim 10, wherein the processor, if the objects adhesion detector that an external object is adhered to the front surface of the receiver, along with calculating maximum value of levels of signals which are involved in the reflected wave received by the plurality of signal receiving antennas, ignores the received signals from the signal receiving antennas for which level difference between the maximum value of the received signal level which has been calculated and signal level which has been received is greater than a predetermined value, and determines distance to or azimuth of the object, based upon the signals received from the signal receiving antennas that are not ignored.

17. A vehicle control device comprising a radar system according to claim 10, controls a vehicle based upon output signal from the radar system, further comprising:

an alerter which, if the objects adhesion detector decides that an external object is adhered upon the front surface of the receiver, notifies a person riding in the vehicle that the receiver is in a state in which the external object is adhered.

18. A vehicle control device comprising a radar system according to claim 10, controls a vehicle based upon output signal from the radar system, further comprising:

a vehicle controller which, if the objects adhesion detector decides that an external object is adhered upon front surface of the receiver, stops control of the vehicle or determines that error in detection of distance to or azimuth of the object is large, or shifts the control of the vehicle to radar fail control in which occurrence of errors is anticipated.

* * * * *

UNITED STATES PATENT AND TRADEMARK OFFICE
CERTIFICATE OF CORRECTION

| | | |
|---|---|---|
| PATENT NO. | : 7,205,929 B2 | Page 1 of 1 |
| APPLICATION NO. | : 11/166590 | |
| DATED | : April 17, 2007 | |
| INVENTOR(S) | : Masahito Shingyoji and Hiroyuki Ando | |

It is certified that error appears in the above-identified patent and that said Letters Patent is hereby corrected as shown below:

On the Title Page, column 1, please add the following:

(30)    Foreign Application Priority Data
    July 9, 2004    (JP) 2004-203302

Signed and Sealed this

Twenty-fourth Day of July, 2007

JON W. DUDAS
*Director of the United States Patent and Trademark Office*